United States Patent [19]

Ozawa et al.

[11] Patent Number: 5,181,066
[45] Date of Patent: Jan. 19, 1993

[54] PAPER DEVICE AND METHOD FOR PHOTOGRAPHIC PRINTER

[75] Inventors: Yoshio Ozawa, Kanagawa; Takashi Matsumoto; Kimitoshi Saito, both of Saitama, all of Japan

[73] Assignee: Fuji Photo Film Co., Ltd., Kanagawa, Japan

[21] Appl. No.: 887,816

[22] Filed: May 26, 1992

[30] Foreign Application Priority Data

May 24, 1991 [JP] Japan ............................ 3-149839

[51] Int. Cl.⁵ ............................................ G03B 29/00
[52] U.S. Cl. ...................................... 355/29; 355/27; 355/28; 355/72
[58] Field of Search .................. 355/27, 28, 29, 72

[56] References Cited

U.S. PATENT DOCUMENTS

4,819,024  4/1989  Kagayama et al. ............... 355/29
5,126,785  6/1992  Erich et al. ......................... 355/28

Primary Examiner—Monroe H. Hayes
Attorney, Agent, or Firm—Sughrue, Mion, Zinn, Macpeak & Seas

[57] ABSTRACT

A paper transporting device for a photographic printer. A pulse motor starts rotating during a magazine setting operation. The rotation of the pulse motor is transmitted to a pair of feed rollers through a pin-clutch mechanism and a paper feed gear train. Immediately before a paper magazine is completely attached to the photographic printer, the feed rollers nip the leading end of photographic paper and pull the photographic paper out of the paper magazine. When changing the paper magazine, a solenoid is turned on to change over the pin-clutch mechanism from the paper feed gear train to a paper rewind gear train. Thereafter, the pulse motor is rotated in reverse, so as to rotate a winding shaft of the paper magazine through the pin-clutch mechanism and the paper rewind gear train. An unexposed portion of the photographic paper remaining in the photographic printer is thus wound back into the paper magazine.

14 Claims, 6 Drawing Sheets

FIG. 6

PAPER DEVICE AND METHOD FOR PHOTOGRAPHIC PRINTER

BACKGROUND OF THE INVENTION

1. Field of the Invention

The present invention relates to device and method for transporting paper in photographic printers, or the like. More particularly, the invention is a photographic paper transporting device in which a single motor is used, in combination with pin-clutch mechanism, to feed photographic paper from a paper magazine and rewind the same.

2. Description of the Related Art

It is known to utilize a paper magazine containing a roll of photographic paper therein in light-tight fashion which is loaded in a photographic printer. The photographic paper is drawn out of the paper magazine and fed to an exposure station by means of a pair of feed rollers. The paper magazine is replaced when the size or surface type of the photographic paper is to be changed. In conventional photographic printers, a keyboard is operated to command a magazine change. Then, a paper transport system transports the photographic paper to locate the trailing end of the last exposed frame at a cutting position, so as to cut off any exposed portion of the photographic paper from unexposed portion. After printing, a winding shaft of the paper magazine is rotated by hand to wind the unexposed portion of the photographic paper back into the paper magazine.

Because of the need for manual rewinding, the conventional paper transport system is cumbersome. In view of this, Fuji Photo Film Co., Ltd. proposed a paper transport system for a photographic printer having a planetary gear-clutch mechanism for performing paper feeding and paper rewinding by means of a single motor (U.S. patent application No. 07/683,912).

In this type of paper transport system, the planetary gear-clutch mechanism is coupled to a paper feed gear train during paper feeding, so as to transmit forward rotation of the motor to a pair of feed rollers. The feed roller pair pulls photographic paper out of a paper magazine and transports it to an exposure station. When rewinding the photographic paper, the planetary gear-clutch mechanism is coupled to a paper rewinding gear train, so as to transmit reverse rotation of the motor to the paper magazine. Thereby, the paper roll in the paper magazine is rotated in a reverse direction so that the photographic paper is rewound onto the paper roll.

In such a paper transport system, teeth of the planetary gear-clutch mechanism may clash with each other, causing poor intermeshing. Furthermore, the gears may be applied with a force which urges the gears away from each other or too close to each other. The direction of such a force depends on the rotational direction of the gears. Therefore, change-over between paper feeding and paper rewinding cannot be performed in a stable manner.

SUMMARY OF THE INVENTION

In view of the foregoing, an object of the invention is to provide a paper transport system for a photographic printer wherein change-over between the paper feeding and the paper rewinding can be reliably and stably performed.

To achieve the above and other objects and advantages, the present invention has a paper rewind gear train for rotating a winding shaft of a paper magazine in a reverse direction, a pair of feed rollers for nipping a leading end of photographic paper and pulling the photographic paper out of the paper magazine, so as to feed the photographic paper to an exposure station, a paper feed gear train for rotating the feed roller pair, a motor rotating in a forward direction during paper feeding, and rotating in reverse during paper rewinding, a first gear meshing with the paper feed gear train, a second gear meshing with the paper rewind gear train, and a pin-clutch mechanism for transmitting the rotation of the motor alternatively to the first or second gear.

Because the invention eliminates selective intermeshing of gears, the pin-clutch mechanism can be stably changed over from a forward to reverse operation.

The pin-clutch mechanism is disposed between the first and second gears, and includes a clutch disc which is brought into engagement with either one of the first and second gears, for transmitting rotation to the selected gear. The pin-clutch mechanism further includes a spring disposed between the clutch disc and the second gear, for urging the clutch disc to be coupled to the first gear.

The motor starts rotating upon setting of the magazine in the printer so as to rotate the feed roller pair for nipping and pulling the paper leading end when the paper leading end approaches the rollers. At that time, the second gear also rotates along with the clutch disc because of friction between the spring and the clutch disc. Therefore, the gears of the paper rewind gear train that is disposed in the photographic printer, and are also rotated during paper feeding. Accordingly, the gears of the paper rewind the gear train smoothly intermesh with the gears that are disposed in the paper magazine, when the paper magazine is set.

BRIEF DESCRIPTION OF THE DRAWINGS

The above and other objects and advantages of the present invention will become apparent from the following detailed description of the preferred embodiments when read in connection with the accompanying drawings, wherein like reference numerals designate like parts throughout several views, and wherein.

DETAILED DESCRIPTION OF THE PREFERRED EMBODIMENT

Figure 1:
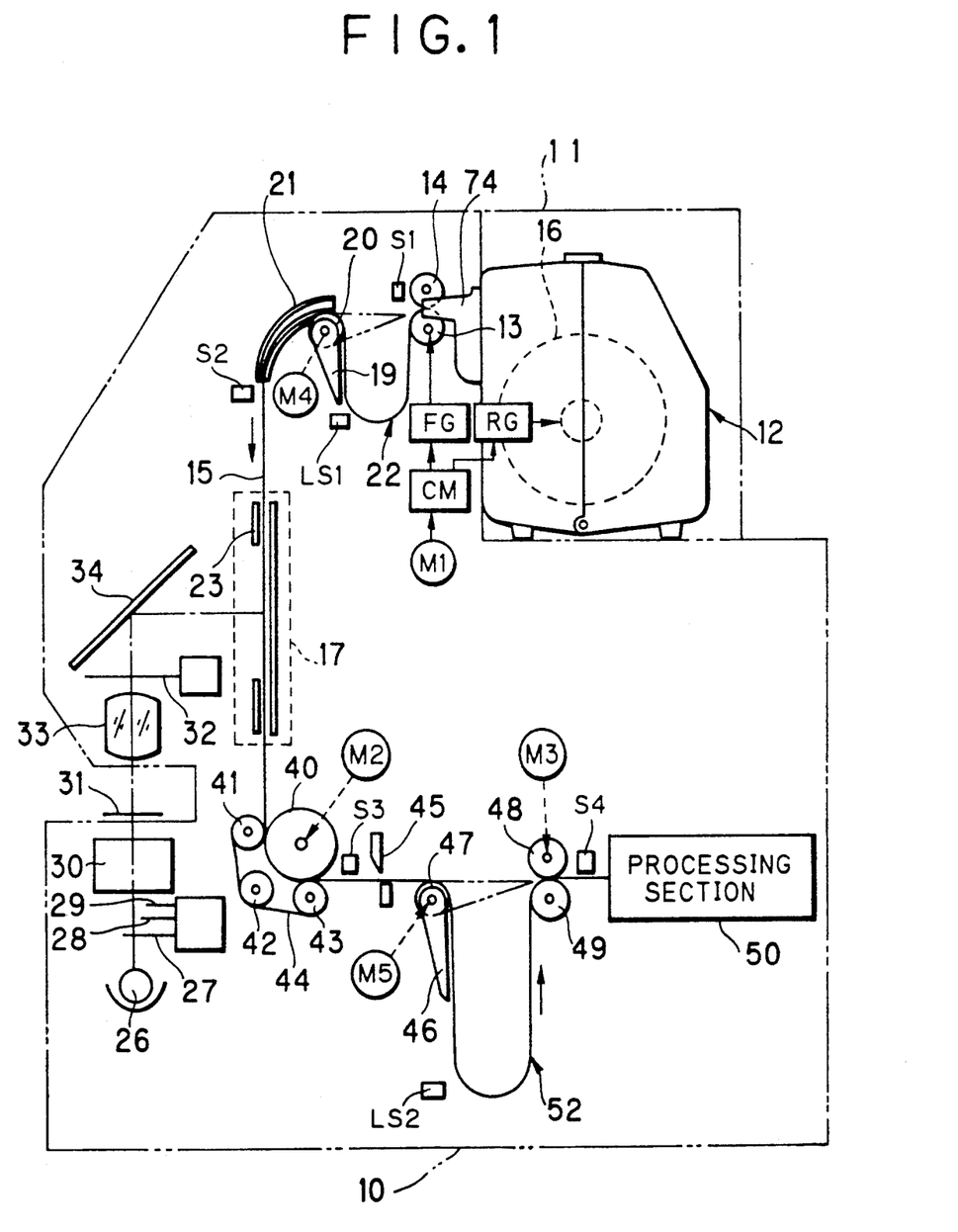
FIG. 1 is a schematic diagram showing a printer processor according to a preferred embodiment of the present invention.

In FIG. 1, a printer processor 10 is provided with a magazine chamber 11, in which a paper magazine 12 is removably placed. A first pair of feed rollers 13 and 14 start rotating while the paper magazine 12 is being placed in the magazine chamber 11, so as to nip a leading end 15a of photographic paper 15 as it approaches the feed roller pair 13 and 14 (see FIG. 2). A pulse motor M1 rotates the feed roller 13 so as to draw out the photographic paper 15 from the paper magazine 12 and transport the same to an exposure station 17.

A first guide plate 19, a guide roller 20 and a paper guide 21 are disposed between the feed roller 13 and the exposure station 17. When the first guide plate 19 is moved by a motor M4 from a first position shown by a chain-dotted line to a retracted position shown by a solid line, a first loop forming section 22 is provided between the feed roller 13 and the guide roller 20, in which an unexposed portion of the photographic paper 15 is stored. The exposure station 17 has a variable mask mechanism 23 which includes a length adjusting mask for adjusting the length of an exposure frame according to the print size, and a width adjusting mask for adjusting the width of the exposure frame according to the paper size and any border required in the print to be made.

Printing light projected form a light source 26 travels through cyan, magenta and yellow filters 27, 28 and 29. The insertion amounts of these filters 27 to 29 into the printing light path are adjusted according to an exposure amount, so as to control the color balance and the intensity of the printing light. The printing light passing through the filters 27 to 29 is diffused and equalized in a mixing box 30, and then illuminates photographic film 31 placed on a film carrier (not shown). Each image recorded on the photographic film 31 is focused, by a printing lens 33 and a mirror 34, onto the photographic paper 15 placed in the exposure station 17.

A main feed roller 40 is disposed downstream of the exposure station 17. The main feed roller 40 is driven by a pulse motor M2. An endless guide belt 44 is in contact with the main feed roller 40 by means of three rollers 41, 42, and 43. The contact area of the main feed roller 40 with the photographic paper 35 is about one fourth of the circumference thereof. A cutter 45, a second guide plate 46, a guide roller 47, and a second pair of feed rollers 48 and 49 are disposed downstream of the main feed roller 40, through which the photographic paper 15 is fed, after exposure, to a processing section 50.

The second guide plate 46 is moved by a motor M5 from a first position shown by a chain-dotted line to a retracted position shown by a solid line, so as to provide a second loop forming section 52 for storing a loop of the exposed photographic paper 15. The second loop forming section 52 is adapted to absorb the difference in paper transporting speed between the printing section and the processing section 50. It is to be noted that the photographic paper 15 is fed intermittently in the printing section, and continuously in the processing section 50. The cutter 45 cuts the exposed paper 15 along a line between adjacent two image frames when the amount of loop stored in the second loop forming section 52 becomes less than a predetermined amount, so that the exposed paper 15 will not stop moving in the processing section 50.

The feed roller 48 is driven by a pulse motor M3. Two loop sensors LS1 and LS2 detect the amount of loops formed in the first and second loop forming sections 22 and 52, respectively. Sensors S1, S2, S3 and S4 are disposed along a paper transporting path, so as to detect the leading end 15a or a trailing end of the photographic paper 15. The sensors S1 to S4 may be photosensors each consisting of a light source and detector having a wave length range out of the sensitive range of the photographic paper 15.

Figure 2:
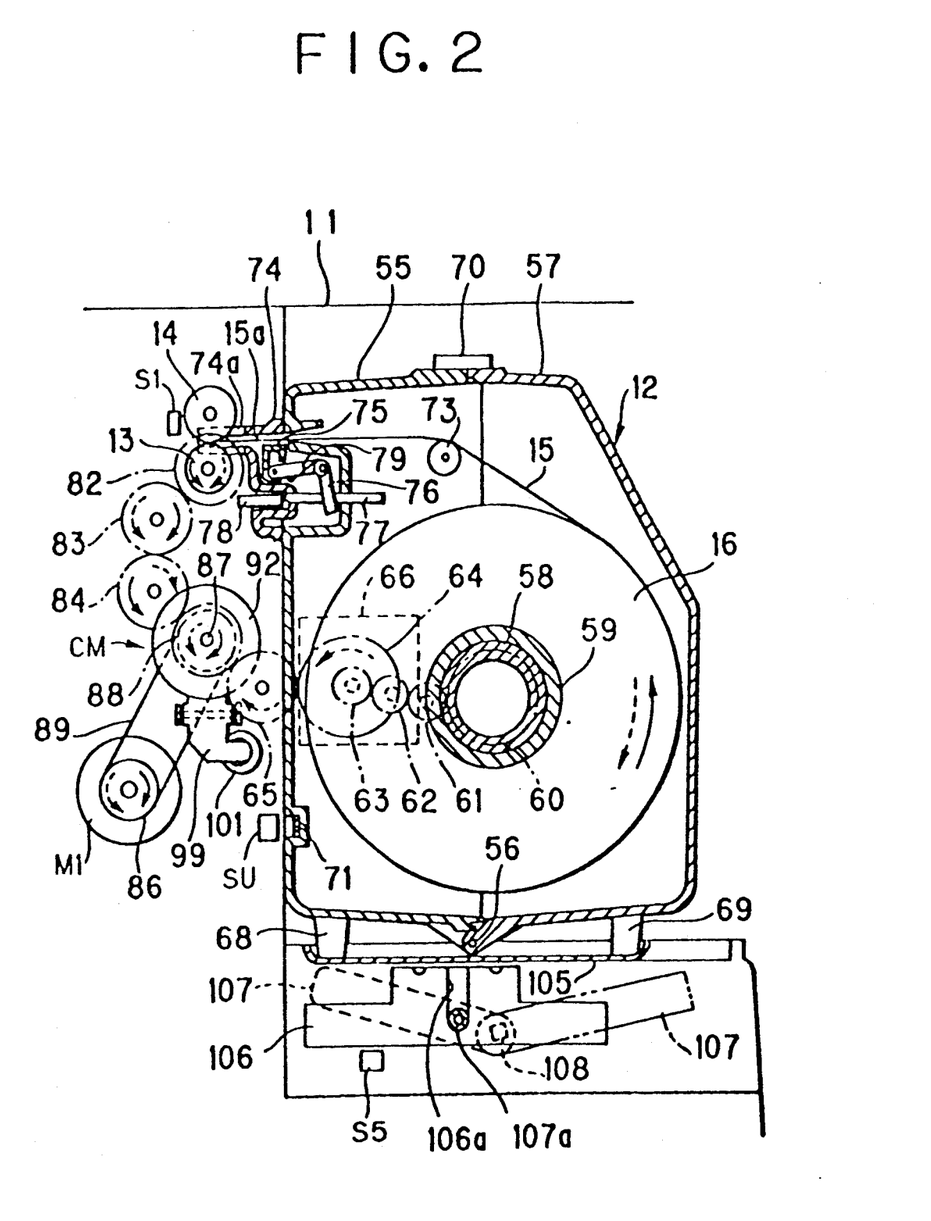
FIG. 2 is a schematic diagram showing the main part of a paper transporting device and a paper magazine used with the preferred embodiment.

Referring to FIG. 2 showing a paper feed gear train and a paper rewind gear train, the paper magazine 12 is constructed of a magazine body 55 and an openable cover 57 attached to the rear side of the magazine body 55 through a hinged joint 56. The paper magazine 12 also has a winding shaft 58 removably mounted thereto. A spool 59 of a paper roll 16 is fitted on the winding shaft 58. A gear 60 is securely fitted on one end of the winding shaft 58. The gear 60 is rotated by a gear 64 through gears 61 to 63. The gear 64 is disposed outside of the magazine body 55, and is covered with a cover 66 having an open front end. The gear 64 is coaxial with the gear 63, and is in mesh with a gear 64 which is disposed in the printer processor 10. The gear 64 is rotated so as to rewind the paper 15 into the paper magazine 12 when printing is terminated before the fill length of the photographic paper 15 has been exposed. These gears 60 to 65 constitute a paper rewind gear train RG.

Legs 68 and 69 are provided on the bottoms of the magazine body 55 and the cover 57. The cover 57 is locked by a lock mechanism 70 in a closed condition. The magazine body 55 has a data section 71 mounted on a front wall thereof for indicating the paper size, type of paper surface, paper sensitivity and other paper data. The paper data is read out by a sensor unit SU. According to the present embodiment, the sensor unit SU is a photosensor, and the paper data are optically readable symbols. However, it is possible to provide a plurality of ridges or bosses in the data section 71 and micro switches as a sensor unit SU which are turned ON or OFF by means of these ridges or bosses. In the alternative, any known data storage and readout device may be employed. For example, it is possible to provide a contact pattern in the data section 71 and group of contact segments in the magazine chamber 11.

The photographic paper 15 drawn from the paper roll 16 is transported to a paper port 74 through a guide roller 73. The paper port 74 is secured to a front and upper portion of the magazine body 55, and is formed with a cutout 74a at a front end thereof. The cut-out 74a allows the first pair of feed rollers 13 and 14 to nip the leading end 15a of the photographic paper 15 when the paper magazine 12 is loaded in the printer processor 10.

In order to shield external light from entering the interior of the paper magazine 12 through the paper port 74, a light-shielding member 75 is provided in the paper port 74. The light-shielding member 75 is connected through a lever 76 to a detector pin 77 for detecting when the paper magazine 12 has been completely loaded in the printer processor 10. The light-shielding member 75 cooperates with the detector pin 77, such that the detector pin 77 is pushed by a projection 78 formed in the magazine chamber 11 when the paper magazine 12 is loaded in the printer processor 10, thereby rotating the lever 76 counterclockwise against an action of a sprint 79. As a result, the light-shielding member 75 opens the paper port 74.

A gear 82 is coupled to the feed roller 13 and is coaxial therewith. The gear 82 is rotated by a gear 84 through a gear 83; these gears 82 to 84 constitute a paper feed gear train FG. Rotational movement of the pulse motor M1 is alternatively transmitted to the paper feed gear train FG or to the paper rewind gear train through a pin-clutch mechanism CM.

Figure 3:
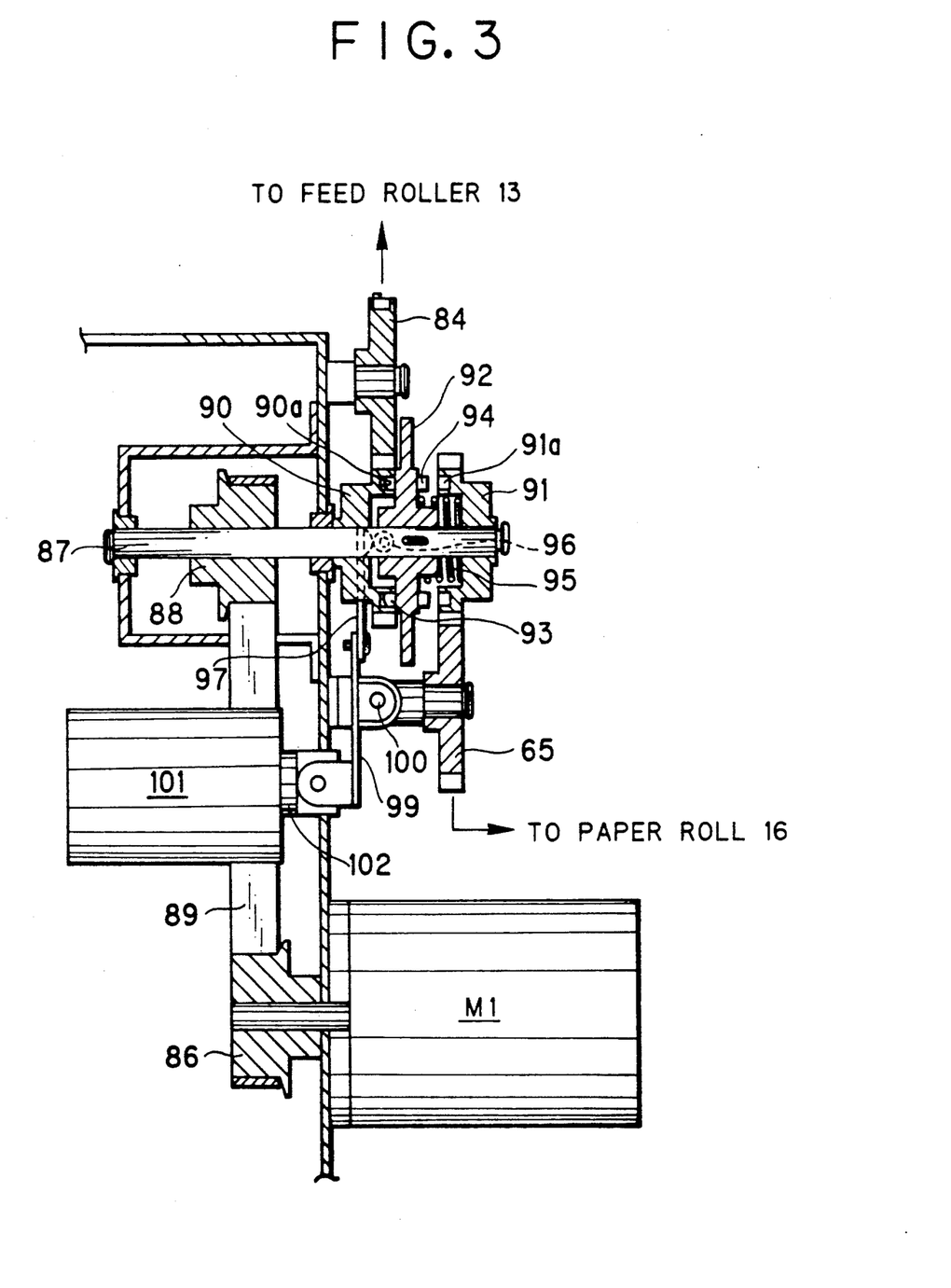
FIG. 3 is a sectional view showing a pin-clutch mechanism of the paper transporting device.

FIG. 3 shows the detail of the pin-clutch mechanism CM, wherein a toothed pulley 86 is coupled to the rotary shaft of the pulse motor M1, and a toothed pulley 88 is coupled to the pulley 86 through a toothed belt 89. The pulley 88 is securely fitted on a rotary shaft 87, on which gears 90 and 91 are rotatably fitted. The gears 90 and 91 are each formed with a recess on one side thereof. The recesses are in opposition to each other. The clutch disc 92 is disposed between these gears 90 and 91. The clutch disc 92 meshes with, and rotates together with, the rotary shaft 87, but is slidable on the rotary shaft 87.

The clutch disc 92 has a plurality of pins 92 implanted on one surface thereof. When these pins 93 are engaged in a corresponding number of holes 90a which are formed in the gear 90, the rotation of the clutch disc 92 is transmitted to the gear 90. Because the gear 90 meshes with the gear 84, the rotation of the pulse motor M1 is transmitted to the feed roller 13.

The clutch disc 92 also has a plurality of pins 94 implanted on the other surface thereof, for transmitting the rotation of the clutch disc 92 to the gear 91. The pins 94 are also adapted to engage corresponding holes 91a formed in the gear 91. The clutch disc 92 is urged by a spring 95 toward the gear 90, so that the clutch disc 92 is removed from the gear 90 and, instead, is brought into engagement with the gear 91, when a roller 96 is pushed by a leaf plate 97 to the right of FIG. 3.

The leaf plate 97 is coupled to a lever 99. The lever 99 is pivotally mounted on an axle 100, and is coupled to a plunger 102 of the solenoid 101, such that the clutch 92 is engaged with the gear 91 when the solenoid 101 is activated so as to pull plunger 102 to the left in FIG. 3. When the clutch 92 is engaged with the gear 91, the rotation of the pulse motor M1 is transmitted to the paper roll 16 through the gear 64.

Referring to FIG. 2, a magazine table 105 for supporting the paper magazine 12 is disposed in the lower portion of the magazine chamber 11 in slidable fashion. The magazine table 105 is secured to a sliding desk 106 having a groove 106a. A roller 107a of a handling lever 107 is fitted in the groove 106a, and slides along the groove 106a when the handling lever 107 is turned about an axle 108. A sensor S5 detects when the magazine table 105 has moved by a predetermined amount.

Figure 4:
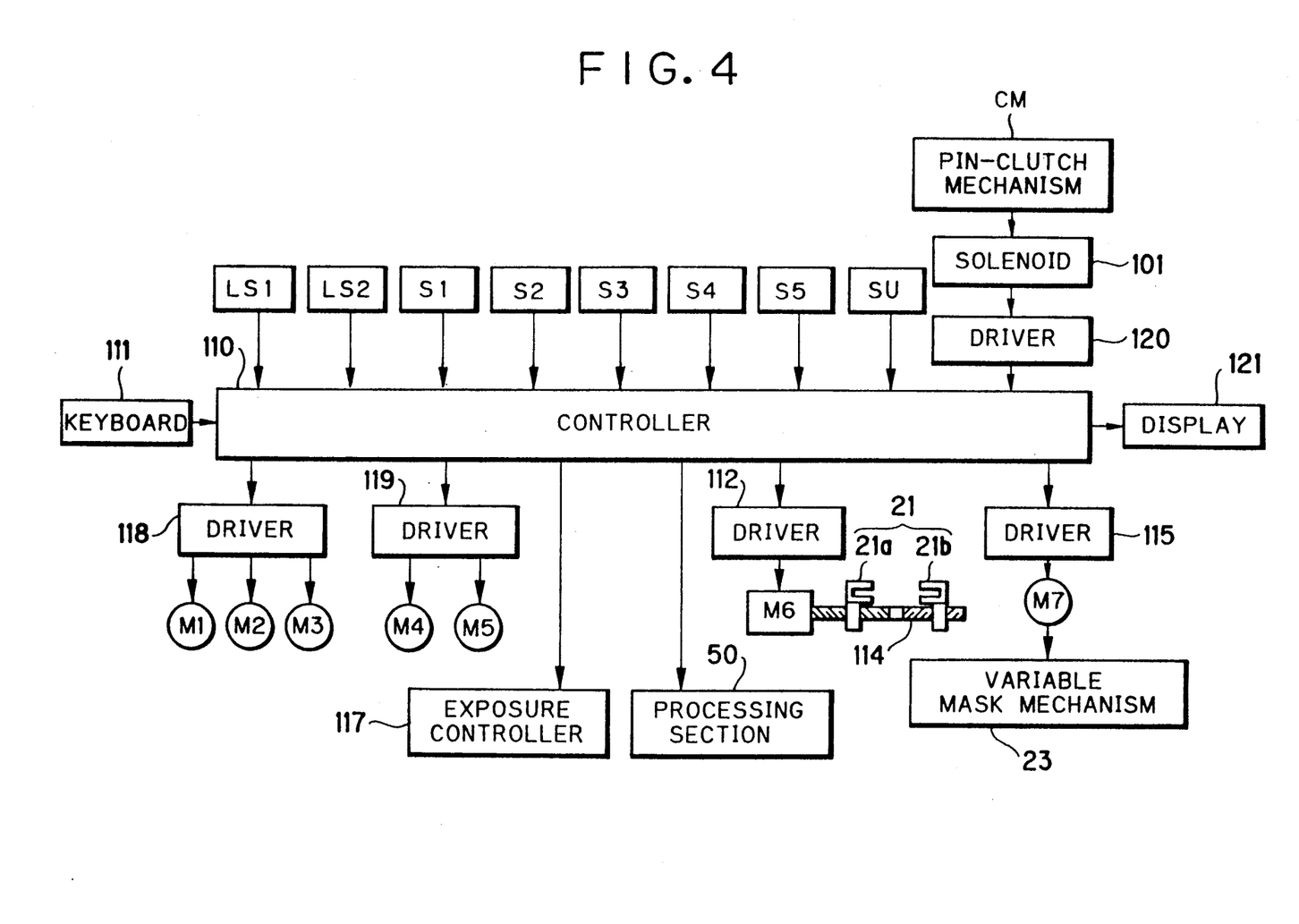
FIG. 4 is a block diagram of a control circuit of the printer processor.

As shown in FIG. 4, the loop sensor LS1 and LS2, the sensors S1 to S5, the sensor unit SU are coupled to a controller 110. A keyboard 111 is also connected to the controller 110, and the controller 110 sequentially controls respective elements of the printer processor 10. Specifically, the controller 110 rotates a pulse motor M6 through a driver 112 based upon the paper data read by the sensor unit SU. The pulse motor M6 is coupled to a feed screw shaft 114, on which two screws whose leading directions are opposite to each other are formed. A pair of guide half members 21a and 21b of the paper guide 21 are engaged with these screws. The spacing between the guide half members 21 and 21b is changed according to the rotation of the feed screw shaft 114. It is to be noted that more than one paper guide 21 is disposed along the paper transporting path, although only one paper guide 21 is shown in FIG. 1.

The controller 110 also drives a motor M7 through a driver 115, so as to adjust the size of the variable mask mechanism 23 according to the paper size and the print size. An exposure controller 117 includes a controller for the filters 27 to 29, a magnification adjuster for the taking lens 33, a driver for a shutter 32, a photometric unit for light measurement of each frame to be printed, and so forth. Drivers 118 and 119 drive the motors M1 to M5. A driver 120 drives the solenoid 101. The controller 110 is also connected to a display 121.

Figure 5:
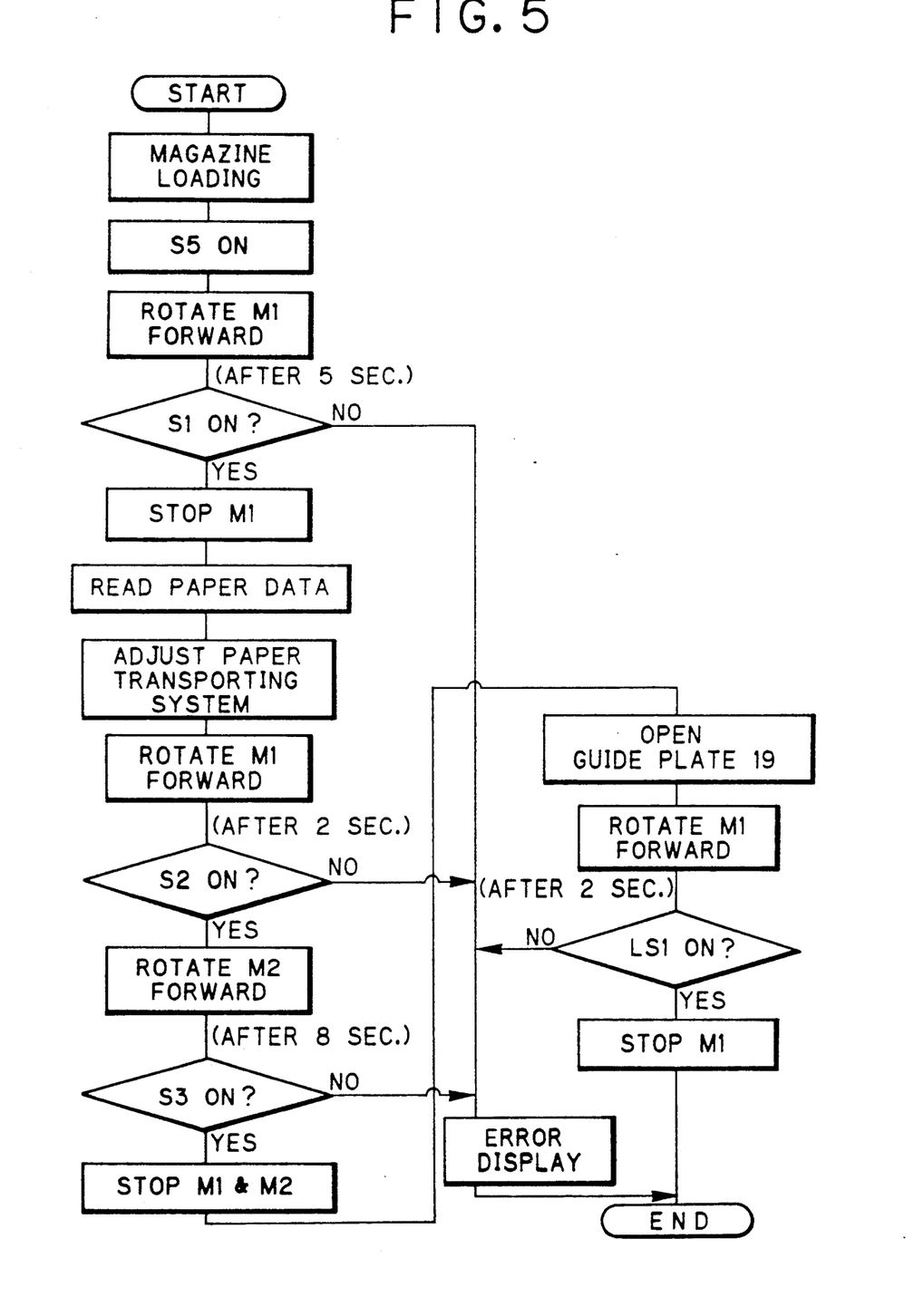
FIG. 5 is a flow chart of the control procedure performed by the control circuit during paper feeding.

The paper loading operation of the above-described embodiment will now be described with reference to FIG. 5.

When loading the photographic paper, first the cover 57 is opened in a dark room, so that the detector pin 77 is retracted through a transmission mechanism (not shown), and thus the light-shielding member 75 opens the paper port 106. While the cover 57 is opened, a roll 16 of photographic paper 15 is loaded in the magazine body 55, and the photographic paper 15 is inserted in the paper port 106 until the leading end 15a thereof appears in the cut-out 106a. When the cover 57 is closed after loading the photographic paper 15 in the paper magazine 12, the light-shielding member 75 moves into a shielding position shown in FIG. 2, wherein the light-shielding member 75 shields the inside of the paper port 106 from external light, and nips the leading end 15a. Then, the cover 57 is locked in the closed condition by the lock mechanism 70.

Thereafter, the paper magazine 12 is placed on the magazine table 105 as shown in FIG. 2. When the handling lever 107 is turned from a position shown by a chain-dotted line to a position shown by a dashed line, the sliding desk 106 begins to move to the left of FIG. 2 together with the table 105, by virtue of the engagement of the roller 107a with the groove 106a. When the sensor S5 is turned ON while the table 105 is moving to the left, the controller 110 drives the pulse motor M1 to rotate in a forward direction. Thereby, the toothed pulley 86 is rotated in a direction of an arrow shown by a solid line in FIG. 2. The rotation of the toothed pulley 86 is transmitted to the rotary shaft 87 through the toothed belt 89 and the toothed pulley 88.

Because the solenoid 101 is turned off while the pulse motor M1 rotates in a forward direction, the clutch disc 92 is urged by the spring 95 to engage the pins 93 with the holes 90a of the gear 90. Therefore, the forward rotation of the pulse motor M1 is transmitted to the gear 90 through the clutch disc 92, and is further transmitted from the gear 90 to the gear 84. Thus, the rotation of the pulse motor M1 is transmitted to the feed roller 13 through the paper feed gear train FG, thereby rotating the first feed roller pair 13, 14.

The handling lever 107 is further turned so as to move the magazine table 105 further to the left of FIG. 2, until the paper magazine 12 is set in the final magazine setting position as shown in FIG. 2. Since the detector pin 77 is pushed by the projection 78 immediately before completion of magazine setting, the light-shielding member 75 is retracted to open the paper port 74.

Upon setting of the paper magazine 12 in the final setting position, the rotating first feed rollers 13 and 14 are moved into the cut-out 74a of the paper port 74. As a result, the leading end 15a is held between the feed rollers 13 and 14 and is thus fed into the printer processor 10. When the leading end 15a passing through the first feed roller pair 13, 14 is detected by the sensor S1, the forward rotation of the pulse motor M1 is stopped.

In the pin-clutch mechanism CM, the spring 95 is disposed between the gear 91 and the clutch disc 92. Accordingly, the gear 91 is rotated with the clutch disc 92 by friction between the spring 95 and the clutch disc 92, and thus the gear 64 is rotated even when the clutch disc 92 is not pressed against the gear 91. Therefore, the teeth of the gear 64 smoothly mesh with the teeth of the gear 65 when the paper magazine 12 is loaded without clashing. Thereafter, because the load of the paper rewind gear train RG and the winding shaft 58 is larger than the force due to friction between the spring 95 and the clutch disc 92, the gear 91 stops rotating.

If the sensor S1 is not turned ON within a time period that is sufficient for setting the paper magazine 12 in the final setting position under a normal condition, e.g. 5 seconds, after the start of rotation of the motor M1, the controller 110 determines that an error has occurred in transporting the magazine 12, and actuates the display 121 to give an alarm. Most transport errors are due to misplacing of the paper leading end 15a. Therefore, in case of a transport error, the paper magazine 12 is removed from the magazine chamber 11 in order to pull the paper leading end 15a slightly away from the paper magazine 12 while nipping the end 15a at the cut-out 74a. Thereafter, the paper magazine 12 is again placed in the magazine chamber 11 for setting.

When the setting of the paper magazine 12 is completed, the sensor unit SU reads the paper data from the data section 71 and sends the data to the controller 110. According to the paper size data included in the paper data, the controller 110 rotates the pulse motor M6, so as to adjust the width of the paper guide 21 to the paper size. The controller 110 also rotates the motor M7, so as to adjust the size of the variable mask mechanism 23 to the print size. Furthermore, the controller 110 transfers the data relating to the paper surface type and the paper sensitivity to the exposure controller 117.

When the above-described preliminary adjustment of the paper transporting system is completed, the controller 110 starts automatic paper loading by rotating the pulse motor M1 again. When the first feed roller pair 13 and 14 starts rotating again, the photographic paper 15 is drawn from the paper magazine 12. While the photographic paper 15 is drawn out, the paper roll 16 is rotated, so that the paper rewinding gear train RG rotates following the paper roll 16. The paper leading end 15a is guided on the first guide plate 19, and through the guide roller 20 and the paper guide 21. When the sensor S2 detects that the paper leading end 15a has passed by the sensor S2, the pulse motor M2 starts rotating forwardly. If the sensor S2 is not turned ON within 2 seconds after the start of rotation of the pulse motor M1, it is determined that a transport error has occurred, such as jamming, and an appropriate alarm is displayed.

When the paper leading end 15a is fed to the main feed roller 40 through the exposure station 17, the paper leading end 15a is held between the main feed roller 40 and the belt 44, and is fed toward the second loop forming section 52, because the main feed roller 40 is rotated by the pulse motor M2. When the sensor S3 detects the paper leading end 15a, rotation of the pulse motor M1 and M2 is stopped. If the sensor S3 is not turned ON within 8 seconds after the start of the pulse motor M2, it is determined that the photographic paper 15 has jammed, and an appropriate alarm is displayed.

After the pulse motors M1 and M2 have stopped, the motor M4 is rotated to open the first guide plate 20, that is, swing the same down to the retracted position shown by the solid line. Immediately thereafter, the pulse motor M1 starts rotating forwardly, so that a loop of the photographic paper 15 drawn from the paper magazine 12 is formed in the first loop forming section 22. When the loop sensor LS1 detects that the amount of the loop goes beyond a predetermined amount, which is at least the length of an image frame, the forward rotation of the pulse motor M1 is stopped. If the loop sensor LS1 is not turned ON within 2 seconds after the start of forward rotation of the pulse motor M1, it is determined that the photographic paper has jammed, and an appropriate alarm is displayed.

In this way, automatic paper loading is completed, and the printer processor is ready to begin a printing procedure. After placing the photographic film 31 on the film carrier, the keyboard 111 is operated to command printing. Then, the photometric unit of the exposure controller 117 measures each image frame to be printed. Based on the photometric value and the exposure data such as sensitivity and surface kind, exposure amounts for three colors are calculated. The filters 27 to 29 are adjusted according to these exposure amounts. Thereafter, the shutter 32 is actuated to print the image frame placed in the exposure station 17 onto the photographic paper 15.

After each printing, the pulse motor M2 is rotated by a constant amount so as to advance the photographic paper 15 by one print frame. Accordingly, the exposed portion of the photographic paper 15 is transported toward the second loop forming section 52, while the unexposed portion is drawn from the first loop forming section 22. When the amount of loop in the first loop forming section 22 is less than a predetermined value, the loop sensor LS1 is turned ON to rotate the pulse motor M1 in a forward direction to feed the photographic paper 15 from the paper magazine 12 to the first loop forming section 22. The pulse motor M1 continues to rotate until the loop sensor LS1 is again turned off, so as to store the predetermined amount of loop of the photographic paper 15 in the first loop forming section 22.

After a plurality of printing operations, the paper leading end 15a is fed to the second feed roller pair 48 and 49, while being guided on the second guide plate 46 positioned in the first position shown by the chain-dotted line. The second feed roller pair 48 and 49 have been rotated by the pulse motor M3 from the start of the first printing, so that the paper leading end 15a is nipped between the second feed roller pair 48 and 49, and is fed toward the processing section 50. When the sensor S4 disposed at the exit of the second feed roller pair 48 and 49 detects the paper leading end 15a, the pulse motor M3 is stopped. Immediately thereafter, the motor M5 starts rotating so as to open the second guide plate 46, that is, swing the same down to the retracted position shown by the solid line.

After the second guide plate 46 is opened because the pulse motor M3 stops, the exposed photographic paper 15 is stored in the second loop forming section 52. When a predetermined amount of loop of photographic paper 15 is stored in the second loop forming section 52, the loop sensor LS2 is turned on, so that the pulse motor M3 starts rotating. As a result, the exposed photographic paper 15 is fed into the processing section 50 at a constant speed. In the processing section 50, the photographic paper 15 is transported at a constant speed, so as to be sequentially passed through a series of developing tanks.

Because the photographic processing is continuously carried out at the constant speed, the amount of the exposed photographic paper 15 stored in the second loop forming section 52 will gradually decrease if the speed of printing is less than the constant speed. When the loop sensor LS2 is turned off, detecting that the amount of the photographic paper 15 in the second loop forming section 52 becomes less than the predetermined value, the cutter 45 cuts off the exposed photographic paper 15 between two adjacent picture frames.

The fore portion of the cut photographic paper 15 is fed into the processor. When the sensor S4 detects a trailing end of the fore portion, the second guide plate 46 swings upward to close the second loop forming section 52. Thereafter, the hind portion of the cut photographic paper is transported on the second guide plate 46 toward the processing section 50. When the leading end of the hind portion is detected by the sensor S4, the second guide plate 46 swings down to open the second loop forming section 52, and the pulse motor M3 stops until the amount of the exposed photographic paper 15 in the second loop forming section 52 reaches the predetermined value, in the same way as described above.

It is possible to provide a second cutter and a third loop forming section between the sensor S4 and the processing section 50, so as to cut the photographic paper 15 by the second cutter when the amount of the photographic paper 15 in the second loop forming section 52 becomes less than the predetermined value, wherein the third loop forming section is for storing an amount of the photographic paper 15 by which the photographic paper 15 is transported during cutting by the second cutter. In this embodiment, the cutter 45 is not used to compensate for the difference in transporting speed between the printing section and the processing section 50. According to this embodiment, it becomes unnecessary to interrupt printing until the paper trailing end is detected by the sensor S4, so that the leading end of the hind portion of the cut photographic paper 15 does not fall down to the opened second loop forming section 52.

Figure 6:
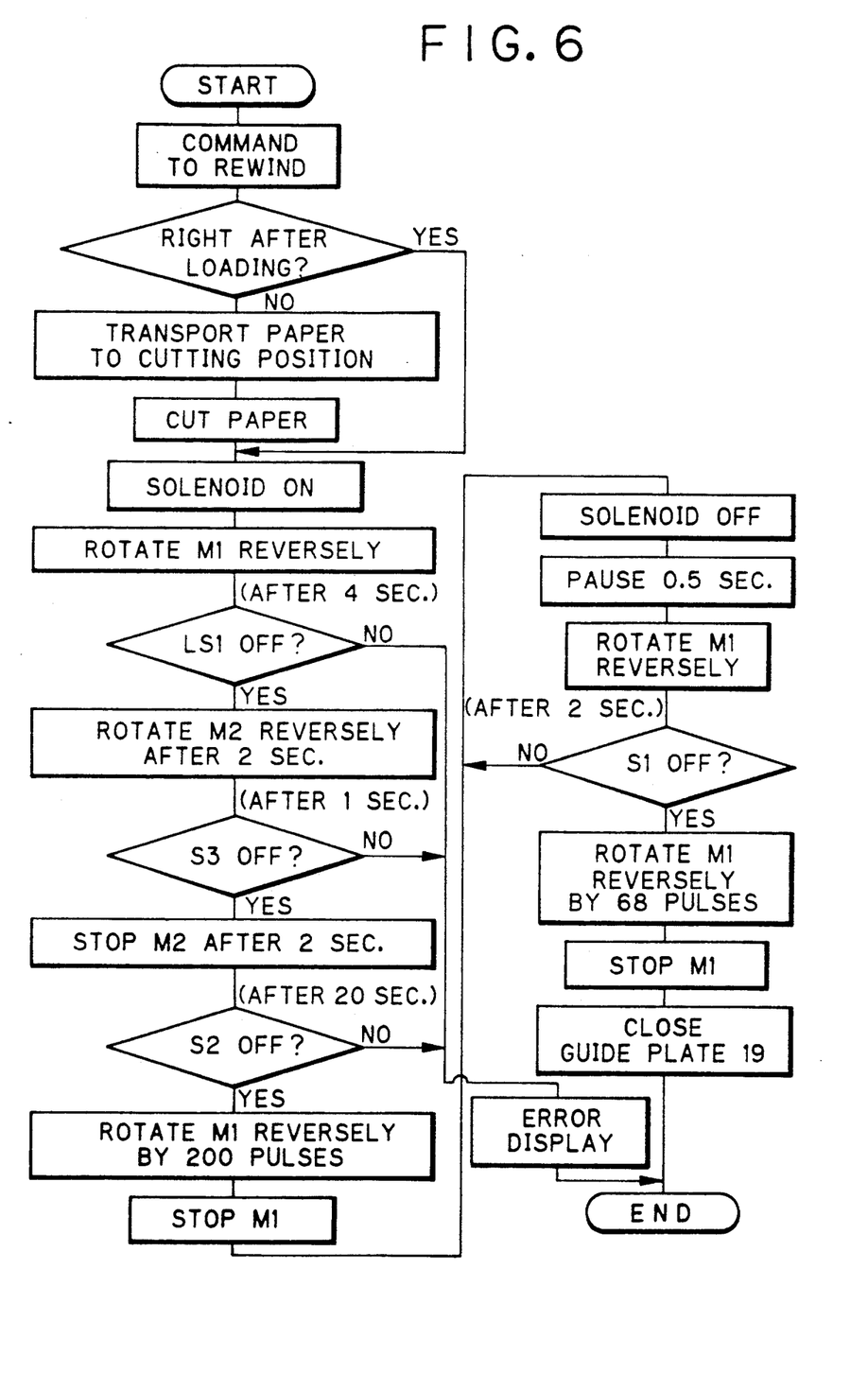
FIG. 6 is a flow chart of the control procedure performed by the control circuit during paper rewinding.

Next, the paper rewinding operation will be described with reference to FIG. 6.

In order to change the size and/or the surface type of photographic paper, the paper magazine 12 presently used is replaced with another paper magazine. When changing the paper magazines, unexposed portions of the photographic paper 15 are wound back into the paper magazine 12, so as not to waste the photographic paper 15. Upon entry of a rewinding command through the keyboard 111, the controller 110 judges whether or not the paper loading has just been carrier out. If so, all of the photographic paper 15 that is pulled out of the paper magazine 12 is unexposed, and hence can be rewound.

On the other hand, if any portion of the photographic paper is exposed, the main feed roller 40 is rotated to transport the photographic paper 15 by an appropriate amount so as to position a predetermined cutting line at the cutter 45. The cutter 45 cuts off the photographic paper 15 along a trailing end of the last exposed frame to separate the unexposed portion from the exposed portion of the photographic paper 15. The exposed paper is then fed into the processing section 50.

After cutting the photographic paper 15, the controller 110 activates the solenoid 101, so that the plunger 102 is retracted. As a result, the lever 99 causes the leaf plate 97 to pivot clockwise, thereby pushing the roller 96. Because the roller 96 is mounted on the axle of the clutch disc 92, the clutch disc 92 moves to the right of FIG. 3 against the force of the spring 95, thereby engaging the pins 94 into the holes 91a of the gear 91. As a result, the pin-clutch mechanism CM changes the power transmission coupling of the pulse motor M1 from the paper feed mechanism FG to the paper rewinding mechanism RG.

Thereafter, the pulse motor M1 rotates in a reverse direction, and the rotation of the pulse motor M1 is transmitted to the winding shaft 58 of the paper magazine 12 through the pin-clutch mechanism CM and the paper rewinding gear train RG, so that the paper roll 16 is rotated in reverse, together with the winding shaft 58. As a result, the unexposed portion of the photographic paper 15 is rewound onto the paper roll 16. Because the paper feed gear train FG is idle during paper rewinding, the first feed roller pair 13 and 14, the paper feed gear train FG and the gear 90 are also rotated, in reverse, along with the movement of the photographic paper 15.

When the amount of loop of the photographic paper 15 stored in the first loop forming section 22 becomes less than the predetermined amount due to paper rewinding, the loop sensor LS1 is turned off. If the loop sensor LS1 is not turned off within 4 seconds after the start of reversal rotation of the pulse motor M1, it is judged that a transport error has occurred, and an error display is given. The predetermined amount of loop in the first loop forming section 22 and the rotational speed of the pulse motor M1 are determined such that the loop amount in the first loop forming section 22 is reduced to zero or about 2 seconds after the loop sensor LS1 has turned OFF. Therefore, the controller 110 causes the pulse motor M2 to rotate reversely at a time when the loop amount in the loop forming section 22 becomes approximately zero, so as to feed a leading end of the unexposed portion of the paper 15 back to the paper magazine 12. The sensor S3 is turned OFF when the paper leading end passes by the sensor S3 during paper rewinding. When 2 seconds have elapsed after the sensor S3 has turned OFF, the paper leading end is normally passed through the main feed roller 40, so that the controller 110 stops the reversal rotation of the pulse motor M2. If the sensor S3 is not turned off within 1 second after the start of the reversal rotation of the pulse motor M2, it is judged that a transport error has occurred, and an error display is given.

Because the pulse motor M1 continues to rotate in reverse after the pulse motor M2 has stopped, the photographic paper 15 continues to be rewound until the unexposed portion thereof is wound back into the paper magazine 12. When the paper leading end of the unexposed portion passes by the sensor S2, the sensor S2 is turned off. After rotating reversely by an amount corresponding to 200 pulses following the turning OFF of the sensor S2, the pulse motor M1 stops. In this way, the paper rewinding is terminated with the paper leading end being protruded by an amount about 100 mm to 150 mm from the end of the paper port 74 of the paper magazine 12. The protruded amount depends on the diameter of the outermost convolution of the paper roll 16.

Next, the controller 110 turns the solenoid 101 OFF so as to allow the clutch disc 92 to slide the rotary shaft 87 due to the force of the spring 95, thereby decoupling from the gear 91 and, instead, coupling to the gear 90. As a result, the feed roller 13 is coupled to the pulse motor M1 through the paper feed gear train FG, the pin-clutch mechanism MC and the toothed belt 89.

The paper roll 16 continues to rotate due to its own inertia after the pulse motor M1 has stopped, so that the unexposed portion of the photographic paper 15 is still rewound while the idling feed roller 13 is rotated in reverse. However, when the feed roller 13 is coupled to the pulse motor M1 through the pin-clutch mechanism 13, because the feed roller 13 has a small diameter, and hence a very large torque is necessary for rotating the pulse motor M1 through the feed roller 13, the inertial reversal rotation of the paper roll 16 is stopped quickly.

Taking the inertial rotation of the paper roll 16 into consideration, the controller 110 causes the pulse motor M1 to rotate again, in reverse, for 0.5 seconds after the turning OFF of the solenoid 101. The reversal rotation of the pulse motor M1 is transmitted to the feed roller 13, as shown by the dotted line, so as to forcibly to insert the unexposed photographic paper 15 into the paper magazine 12.

When the first feed roller pair 13 and 14 are rotated in reverse to cause the paper leading end to pass by the sensor S1, the sensor S1 is turned OFF. Following the turning off of the sensor S1, the pulse motor M1 rotates by an amount corresponding to 68 pulses, to rewind the photographic paper by the first feed roller pair 13 and 14. As a result, the paper leading end exits from the first feed roller pair 13 and 14, and is positioned in the cutout 74a of the paper port 74. Finally, the controller 110 causes the motor M4 to rotate in reverse so as to close the first guide plate 19. If the sensor S1 is not turned OFF within 2 seconds after the start of reversal rotation of the pulse motor M1, an error display is given.

In this manner, paper rewinding is completed. The controller 110 displays a message on the display 121 to notice that removal of the paper magazine 12 is allowed. Then, the operator turns the handling lever 107 from the position shown by dashed line to the position shown by chain-dotted line, so as to retrieve the magazine table 105. Then, the paper port 74 is removed from the first feed roller pair 13 and 14, and the gear 64 is disengaged from the gear 65. Furthermore, because the detector pin 77 is free from the projection 78, the light-shielding member 75 moves upward to nip the paper leading end, so that the paper leading end is prevented from falling to the magazine body 55 and the paper magazine 12 is shielded from external light.

As described above, in the first step of paper rewinding, the paper roll 16 is rotated in reverse until the paper leading end 15a is position 100 mm to 150 mm away from the paper port 74, and in the second step, the first feed roller pair 13 and 14 is rotated in reverse to feed the photographic paper forcibly into the paper magazine 12. Therefore the paper leading end 15a will not enter the magazine body 55 completely because of inertial rotation of the paper roll 16. And that, because the paper leading end 15a stays away from the first pair of feed rollers 13 and 14, the paper magazine 12 can be easily removed from the magazine chamber 11.

After the removal of the paper magazine 12, another paper magazine containing a paper roll different kind, is placed on the magazine table 105. As to the new paper magazine, magazine setting and paper loading can be carried out in the same way as described above. In resetting the paper magazine 12 that was removed from the magazine chamber 11, it is necessary to pull out the paper leading end so as to align the same with the front end of the paper port 74 in order to allow the first pair of feed rollers 13 and 14 to nip the paper leading end.

Although the paper leading end is forcibly fed into the paper magazine 12 by means of reverse rotation of the first feed rollers 13 and 14 in the above embodiment, it is possible to rewind the photographic paper 15 using the paper rewind gear train RG only. In this embodiment, the reversal rotation of the pulse motor M1 is stopped right after the detection of the paper leading end 15a by the sensor S1 and, simultaneously, the pin-clutch mechanism CM is changed over to the paper feed gear train FG. Finally, the feed roller 14 is moved upward to release the nipping condition of the paper leading end 15a by the first feed roller pair 13 and 14. In this embodiment, when setting a paper magazine, upon a detection signal from the sensor S5, the feed roller 14 is moved to contact the feed roller 13, so as to be in the nipping condition and then the feed roller 13 begins to be rotated.

While the present invention has been described in detail above with reference to a preferred embodiment shown in the drawings, it will be apparent to those skilled in the art that various changes and modifications of the present invention are possible without departing from the scope of the invention as defined by the following claims.

What is claimed is:

1. A paper transporting device for a photographic printer, said device comprising:
    a pair of feed rollers for nipping a leading end of photographic paper and pulling said photographic paper out of a paper magazine attached to said photographic printer, so as to feed said photographic paper to an exposure station, said feed rollers being disposed near said paper magazine;
    a paper feed gear train operatively coupled to said feed rollers;
    a paper rewind gear train operatively coupled to a winding shaft of said paper magazine, so as to rewind said photographic paper onto said winding shaft;
    a motor rotating in a first direction during a paper feeding operation, and rotating in a second direction, which is reverse to said first direction, during a paper rewinding operation;
    a first gear in meshing engagement with said paper feed gear train;
    a second gear in meshing engagement with said paper rewind gear train;
    a pin-clutch mechanism coupled to said motor so as to transmit the rotation of said motor alternatively to one of said first and second gears; and
    control means for controlling said motor and said pin-clutch mechanism.

2. A paper transporting device as recited in claim 1, wherein said pin-clutch mechanism comprises a slidable clutch disc disposed between said first and second gears, at least one pin disposed on each side of said clutch disc, at least a hole being formed in each of said first and second gears for engagement with an associated of said pins, and a changeover device coupled to said clutch disc so as to selectively bring said pins of said clutch disc into engagement with said holes formed in one of said first and said second gears, so as to selectively transmit the rotation of said motor to one of said first and second gears, respectively.

3. A paper transporting device as recited in claim 2, wherein said changeover device of said pin-clutch mechanism includes a spring disposed between said clutch disc and said second gear, so as to urge said clutch disc into engagement with said first gear, a lever coupled to said clutch disc so as to push said clutch disc into engagement with said second gear against the force of said spring, and a solenoid connected to said lever so as to activate said lever when said solenoid is engaged.

4. A paper transporting device as recited in claim 3, wherein said paper rewinding gear train includes a third gear which is disposed in said photographic printer and is coupled to said second gear, and a fourth gear which is disposed in said paper magazine for rotating said winding shaft, said third gear and said fourth gear being brought into meshing engagement with each other when said paper magazine is completely attached to said photographic printer.

5. A paper transporting device as recited in claim 4, wherein said second and third gears are rotated along with said clutch disc due to a frictional interface between said spring and said second gear and said spring and said clutch disc, before said third gear meshes with said fourth gear, while said clutch disc is engaged with said first gear and is rotated by said motor for said paper feeding operation.

6. A paper transporting device as recited in claim 5, further comprising a cutting means for cutting said photographic paper at a position upstream of an exposed portion of said photographic paper.

7. A paper transporting device as recited in claim 6, wherein said photographic printer includes a slidable magazine table for carrying said paper magazine to be attached to and removed from said photographic printer, and wherein said control means causes said feed rollers to be rotated in a paper feed direction by rotating said motor in said first direction when said magazine table moves near a predetermined position at which said paper magazine is completely attached to said photographic printer.

8. A paper transporting device as recited in claim 7, further comprising:
a reading device for reading out paper data from said paper magazine; and
an adjusting device for adjusting the size of a paper guide device of said paper transporting device in accordance with said paper data.

9. A paper transporting device as recited in claim 8, wherein said control means causes said motor to stop when the leading end of said unexposed portion of said photographic paper, obtained by said cutting means, reaches a position near said feed rollers during paper rewinding, said control means operates said changeover device so as to disengage said pin-clutch mechanism from said second gear and engage said pin clutch with said first gear, and thereafter rotates said motor in said second direction, so as to forcibly move said leading end into said paper magazine by rotating said feed rollers in a direction reverse to said paper feed direction.

10. A paper transporting device as recited in claim 9, wherein said paper magazine includes a light-shielding mechanism disposed at a paper port thereof, said light-shielding mechanism being closed to nip said photographic paper when said paper magazine is detached from said photographic printer, and interacting with said photographic printer so as to be opened immediately before said paper magazine is completely attached to said photographic printer.

11. A method of transporting a photographic paper for a photographic printer, comprising the steps of:
A. bringing a pin-clutch mechanism into engagement with a first gear which meshes with a paper feed gear train, so as to couple a motor to a pair of feed rollers through said paper feed gear train;
B. rotating said motor in a first direction so as to rotate said feed rollers in a paper in a paper feed direction;
C. nipping photographic paper between said feed rollers rotating in the paper feed direction so as to pull said photographic paper out of a paper magazine and feed said photographic paper to an exposure station;
D. cutting said paper at a portion upstream of an exposed portion of said photographic paper when said paper magazine is to be changed;
E. releasing said pin-clutch mechanism from said first gear and bringing said pin-clutch mechanism into engagement with a second gear which meshes with a paper rewind gear train, so as to couple said motor to a winding shaft of said paper magazine through said paper rewind gear train; and thereafter
F. rotating said motor in a second direction to said first direction, so as to rotate said winding shaft and rewind said photographic paper onto said winding shaft.

12. A method as recited in claim 11, wherein said pin-clutch mechanism includes a clutch disc disposed between said first and second gears, at least one pin provided on each side of said clutch disc, at least a hole formed in each of said first and second gears, a spring disposed between said clutch disc and said second gear so as to urge said clutch disc to move toward said first gear, a lever coupled to said clutch disc so as to push said clutch disc toward said second gear and a solenoid connected to said lever so as to activate said lever, and wherein
said step E further includes the step of turning said solenoid ON to activate said lever so as to bring said clutch disc into engagement with said second gear against the force of said spring; and
said step A further includes the step of turning said solenoid OFF to make said lever inactive, thereby bringing said clutch disc into engagement with said first gear due to the force of said spring.

13. A method as recited in claim 12, further comprising the steps of:
stopping said motor when the leading end of said unexposed portion of said photographic paper obtained by said cutting step, reaches a position near said feed rollers after said step E;
releasing the coupling of said motor to said winding shaft and coupling said motor to said feed rollers; and thereafter
moving said photographic paper forcibly into said paper magazine until said paper leading end detaches from said feed rollers, by rotating said feed rollers in a direction reverse to said paper feed direction.

14. A method as recited in claim 13, further comprising the step of reading paper data from said paper magazine, and wherein said step B further includes:
stopping rotation of said feed rollers rotating in said paper feed direction immediately after said leading end of said photographic paper passes through said feed rollers;
adjusting the size of a paper guide device in accordance with said paper data; and thereafter
rotating said feed rollers again in said paper feed direction.

* * * * *